G. W. McMUNN & A. C. HOWELL.
AIR BRAKE.
APPLICATION FILED JUNE 25, 1908.
899,318.
Patented Sept. 22, 1908.
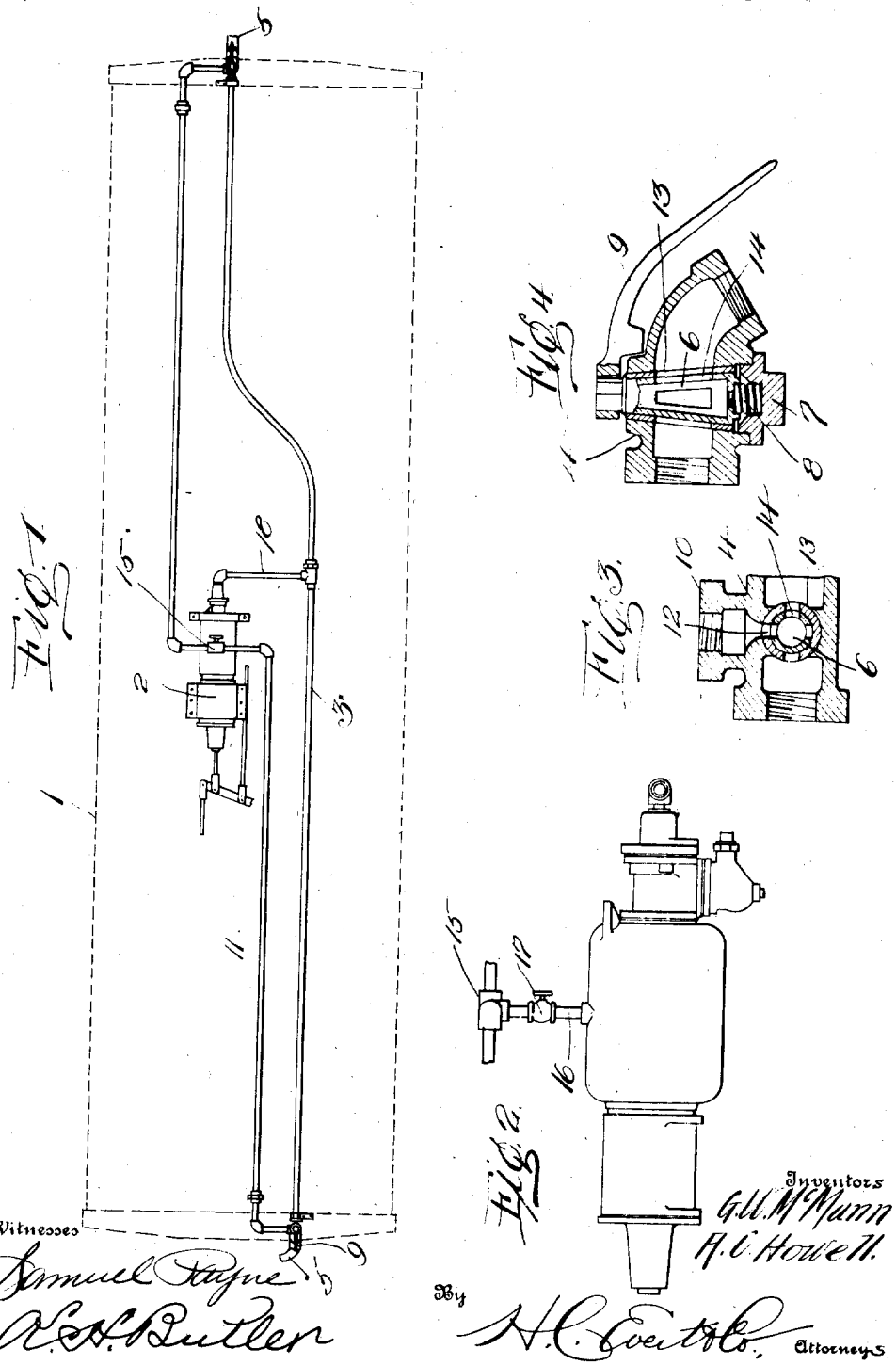

UNITED STATES PATENT OFFICE.

GEORGE W. McMUNN AND ALLAN C. HOWELL, OF PITTSBURG, PENNSYLVANIA.

AIR-BRAKE.

No. 899,318.      Specification of Letters Patent.      Patented Sept. 22, 1908.

Application filed June 25, 1908. Serial No. 440,316.

*To all whom it may concern:*

Be it known that we, GEORGE W. McMUNN and ALLAN C. HOWELL, citizens of the United States of America, residing at Pittsburg, in the county of Allegheny and State of Pennsylvania, have invented certain new and useful Improvements in Air-Brakes, of which the following is a specification, reference being had therein to the accompanying drawing.

This invention relates to air brakes, and the primary object of our invention is the provision of positive and reliable means for releasing a brake cylinder when closing an angle cock.

A further object of our invention is to dispense with the ordinary type of release valve at present used in connection with a brake cylinder.

A still further object of our invention is to provide a novel angle cock for simultaneously controlling a train line, brake cylinder, and a combined brake cylinder and auxiliary reservoir.

A still further object of our invention is to prevent a brake cylinder from being released except by the closing of an angle cock.

It is the present practice to use a release valve upon the brake cylinder of a car, and provide said valve with outwardly extending rods that can be manipulated from either side of a car. Such a construction allows the release valve to be tampered with by unauthorized persons, and allows the valve to be set in an open position by securing the rods with stones, sticks or the like in such position as will retain the valve in an open position. The present invention obviates such practice, and it is only possible to release the valve through the medium of an angle cock at each end of the car.

The detail construction entering into our invention will be presently described and then specifically pointed out in the appended claims.

Referring to the drawings:—Figure 1 is a diagrammatic view of a car, illustrating the connections between the train line, brake cylinder, and the angle cocks at the ends of the car, Fig. 2 is an elevation of a brake cylinder constructed in accordance with our invention, Fig. 3 is a horizontal sectional view of an angle cock constructed in accordance with our invention, and Fig. 4 is a longitudinal sectional view of the same.

In the accompanying drawings, 1 designates the outline of a freight car, 2 a combined brake cylinder and auxiliary reservoir, 3 a train line pipe, provided at each end with an angle cock 4 for hose connections 5. The angle cocks 4 are identical in construction, each angle cock having a plug 6, a cap 7, a spring 8, and a handle 9, these parts being common in the standard freight car angle cock.

To carry our invention into effect, we provide the body of each angle cock with a connection 10 for a pipe 11, said pipe communicating with the angle cock by virtue of an additional port 12 provided therefor in the bushing 13 of the cock, and in order to control the passage of air through this port, we provide the plug 6 with an additional port 14. The pipes 11 extend to the brake cylinder 2 and by virtue of a T-connection 15 said pipes are connected to a stand pipe 16, carried by the brake cylinder 2 and communicating therewith. This stand pipe 16 is provided with a globe valve 17 of a common form as a means for permanently controlling the release of a brake cylinder. The brake cylinder 2 is connected to the train line pipe 3 by a pipe 18, and the brake rigging and apparatus used in connection with the freight car 1 is the same as at present used. With the angle cocks in the position illustrated in the drawings, the brake cylinder 2 is permitted to exhaust through the pipes 11, ports 12, plugs 6 and ports 14, and the train line 3 is closed. When the handle 9 of either angle cock is turned a quarter of a revolution to the right, the port 12 is closed and the train line opened.

It is thought that the utility and operation of our invention will be fully understood from the foregoing description, and while in the drawings there is illustrated the preferred embodiments of construction, it is to be understood that the elements therein can be varied or changed without departing from the spirit of the invention.

Having now described our invention what we claim as new, is:—

1. The combination with an air brake cylinder, and a train pipe connecting therewith, of angle cocks carried by said train pipe, a stand pipe carried by said brake cylinder, a valve carried by said stand pipe, extensions carried by said angle cocks and connecting with said stand pipe, and movable plugs arranged in said angle cocks for releasing said brake cylinder and closing said train pipe.

2. The combination with an air brake cylinder, and a train pipe connecting therewith, of angle cocks carried by said train pipe, a stand pipe carried by said brake cylinder, extensions carried by said angle cocks and connecting with said stand pipe, and movable plugs arranged in said angle cocks for releasing said brake cylinder and closing said train pipe.

3. The combination with an air brake cylinder and a train pipe connecting therewith, of angle cocks carried by said train pipe and communicating with said cylinder independent of said train pipe, and movable plugs arranged in said angle cocks for releasing said cylinder and closing said train pipe.

In testimony whereof we affix our signatures in the presence of two witnesses.

GEORGE W. McMUNN.
ALLAN C. HOWELL.

Witnesses:
L. F. BECKER,
MAX H. SROLOVITZ.